US009973496B2

(12) United States Patent
Boenisch et al.

(10) Patent No.: US 9,973,496 B2
(45) Date of Patent: May 15, 2018

(54) CONTROLLED USE OF A HARDWARE SECURITY MODULE

(71) Applicant: INTERNATIONAL BUSINESS MACHINES CORPORATION, Armonk, NY (US)

(72) Inventors: Volker M. M. Boenisch, Boeblingen (DE); Reinhard Buendgen, Boeblingen (DE); Franziska Geisert, Boeblingen (DE); Jakob C. Lang, Boeblingen (DE); Mareike Lattermann, Boeblingen (DE); Angel Nunez-Mencias, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 14/875,828

(22) Filed: Oct. 6, 2015

(65) Prior Publication Data

US 2016/0105429 A1    Apr. 14, 2016

(30) Foreign Application Priority Data

Oct. 8, 2014 (GB) .................................. 1417784.4

(51) Int. Cl.
H04L 29/06 (2006.01)
(52) U.S. Cl.
CPC ........ H04L 63/0853 (2013.01); H04L 63/062 (2013.01); *H04L 2463/062* (2013.01)
(58) Field of Classification Search
None
See application file for complete search history.

(56) References Cited

U.S. PATENT DOCUMENTS 7,278,582 B1   10/2007   Siegel et al.
8,160,244 B2    4/2012   Buer
(Continued)

FOREIGN PATENT DOCUMENTS

WO    WO 2008/042175 A2    4/2008

OTHER PUBLICATIONS

Gemalto N.V., "Protiva Strong Authentication Server: A Flexible Authentication Platform", Online Product Brochure, www.gemalto.com (2011) (2 pages).
(Continued)

*Primary Examiner* — Brandon S Hoffman
(74) *Attorney, Agent, or Firm* — Steven S. Chiu, Esq.; Kevin P. Radigan, Esq.; Heslin, Rothenberg, Farley & Mesiti, P.C.

(57) ABSTRACT

Methods are provided for using a hardware module connectable to multiple computer systems, where the multiple computer systems are connectable to a server within a common network. The method includes: providing a network address of the server in persistent memory of the hardware security module; providing an encrypted secret entity in the persistent memory of the hardware security module; providing a private key in the persistent memory of the hardware security module; and based on the hardware security module being connectable to one of the computer systems, the method includes: establishing a secure connection between the hardware security module and the server; retrieving, via the secure connection, a wrapping key from the server and storing it in volatile memory of the hardware security module; and decrypting the encrypted secret entity with the wrapping key and storing the decrypted secret entity in the volatile memory of the hardware security module.

20 Claims, 8 Drawing Sheets

(56) References Cited

U.S. PATENT DOCUMENTS

| | | |
|---|---|---|
| 8,213,620 B1 * | 7/2012 | Sussland ................. H04L 9/083 |
| | | 380/278 |
| 8,302,172 B2 | 10/2012 | Grandcolas et al. |
| 9,043,604 B2 | 5/2015 | Brickell et al. |
| 9,344,455 B2 | 5/2016 | Himawan et al. |
| 9,667,626 B2 | 5/2017 | Lin |
| 2008/0080708 A1 * | 4/2008 | McAlister ............. H04L 9/0822 |
| | | 380/44 |
| 2010/0306531 A1 | 12/2010 | Nahari |
| 2011/0191599 A1 | 8/2011 | Chou et al. |
| 2012/0179904 A1 * | 7/2012 | Dunn .................... G06F 21/575 |
| | | 713/155 |
| 2013/0085944 A1 | 4/2013 | Fielder |
| 2013/0173759 A1 | 7/2013 | Herse et al. |
| 2013/0179676 A1 | 7/2013 | Hamid |
| 2014/0281483 A1 * | 9/2014 | Vigliaturo ........... H04L 63/0471 |
| | | 713/153 |

OTHER PUBLICATIONS

SafeNet, Inc., "SafeNet Hardware Security Modules: True Hardware-Based Key Management for Next-Generation PKI Applications", Online Product Brochure, www.safenet-inc.com (2011) (5 pages).

Search Report for GB Application No. GB1417784.4, filed Oct. 8, 2014, dated Apr. 17, 2015 (3 pages).

\* cited by examiner

CONTROLLED USE OF A HARDWARE SECURITY MODULE

PRIOR FOREIGN APPLICATION

This application claims priority from United Kingdom (GB) patent application number 1417784.4, filed Oct. 8, 2014, which is hereby incorporated herein by reference in its entirety.

BACKGROUND

The present invention relates in general to data processing systems, and in particular, to a method for using a hardware security module in a controlled manner, as well as to a hardware security module and a data processing system.

Hardware security modules, for example, are used in secure financial transactions initiated from an electronic device, required due to the ability to use the phone function (e.g., of a mobile handset) to feed data back to a Trusted Integrity Manager as part of a Mobile Embedded Payment program in the financial industry to authenticate users (e.g., a consumer).

According to US 2010/0306531 A1, a mobile embedded payment (MEP) system operated, for example, by a financial service provider (FSP) in the financial industry includes a Trusted Integrity Manager (TIM), as part of, or functioning in conjunction with, a Trusted Service Manager (TSM). TIM enables the ability to use the phone function of a mobile handheld device to feed data (including, e.g., time and geo location) back to the TIM to authenticate users in the context, for example, of financial transactions. TIM Works with TSM, which may be loosely described as a primitive key management system. TIM provides additional security, especially with payment applications. TIM includes many different subsystems, and modules and components within the subsystems. TIM works with the TSM to provide additional security between entities (e.g., mobile device, payment provider, financial institution) in secure transactions.

US 2010/0306531 A1 discloses a system, which includes: a device including a hardware security module (HSM) in which the HSM protects a secret material so that the secret material is inaccessible by unauthenticated and unintended entities and the HSM communicates via a protected communication channel with an entity; and the device is configured to engage in a zero-knowledge proof with the entity via the communication channel to authenticate the secret material. The method also includes: protecting a secret material in a hardware security module of a device; establishing an end-to-end chain of trust over a communication channel, in which the channel has two endpoints, the hardware security module being at one of a first endpoint and a second endpoint; and an unbroken chain of trust is established between the first endpoint and the second endpoint of the channel; and authenticating the secret material in which the first endpoint and second endpoint engage in a zero-knowledge proof via the communication channel to authenticate the secret material. The method further includes: protecting a private key in a secure vault of a device; and using a zero-knowledge proof of knowledge with the private key as proof material to authenticate the device so that the private key remains private to the device.

SUMMARY

In one or more aspects, a method is provided herein for using a hardware security module connectable to multiple computer systems, the multiple computer systems being connectable to a server within a common network, and the method including: providing a network address of the server and persistent memory of the hardware security module; providing an encrypted secret entity in the persistent memory of the hardware security module; providing a private key in the persistent memory of the hardware security module; and based on the hardware security module being connected to one of the computer systems of the multiple computer systems, the method includes: establishing a secure connection between the hardware security module and the server; retrieving, via the secured connection, a wrapping key from the server and storing it in volatile memory of the hardware security module; and decrypting the encrypted secret entity with the wrapping key and storing the encrypted secret entity in the volatile memory of the hardware security module.

Computer systems and computer program produce relating to one or more aspects of the above-summarized method are also described and claimed herein.

BRIEF DESCRIPTION OF THE DRAWINGS

Embodiments of the present invention are described below in detail, by way of example only, with reference to the accompanying drawings, wherein is shown in.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention, and therefore should not be considered as limiting the scope of the invention.

Figure 1:
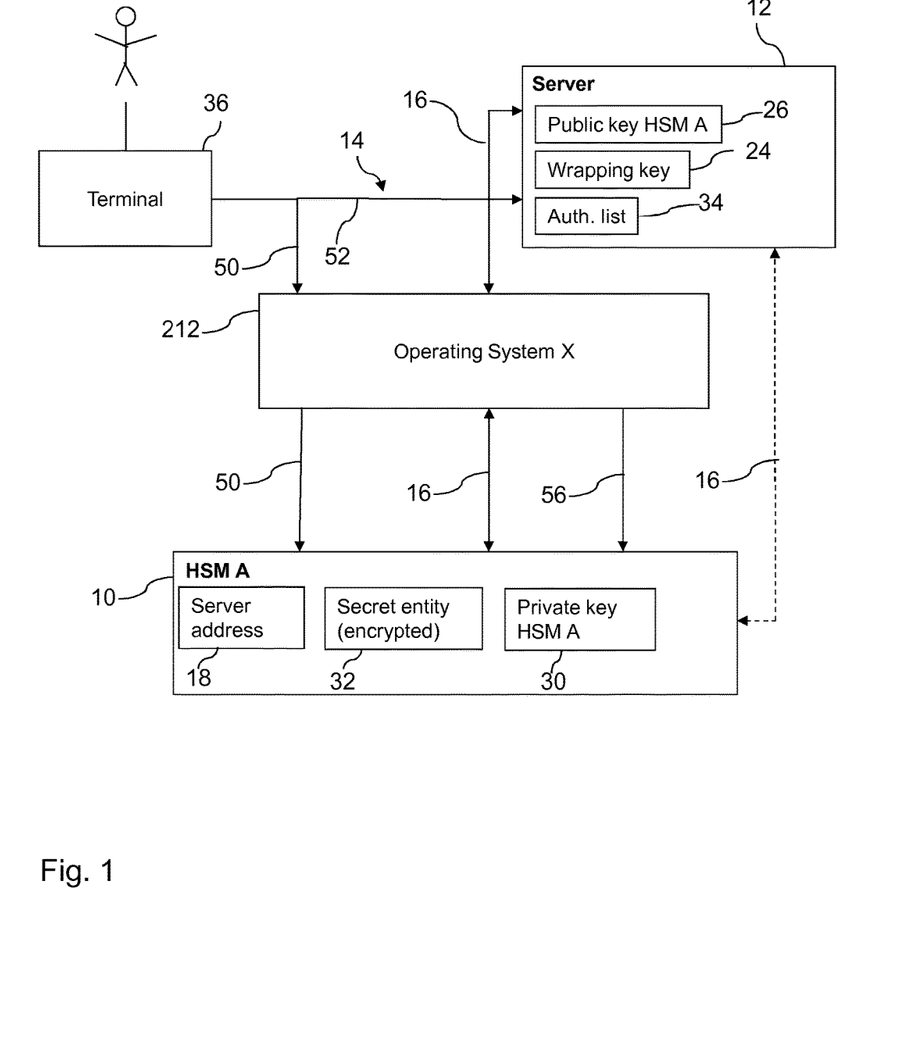
FIG. 1 one embodiment for initializing a server and a hardware security module connected with a computer system and the server, in accordance with one or more aspects of the present invention.

FIG. 1 depicts one embodiment for initializing a server 12 and a hardware security module 10 connected to a computer system 212 and a server 12, according to one or more aspects of the present invention. The computer system 212 is being connected to the server 12 within a common network 14. The method, using a trusted terminal 36, includes (i) storing a network address 18 of the server 12, labeled "server address" throughout the Figures, in the persistent memory 22 of the hardware security module 10 (shown in FIG. 6); (ii) storing the public key 26 of the hardware security module 10 on the server 12; (iii) establishing a secure connection 16 between the hardware security module 10 and the server 12; (iv) retrieving, via the secure connection 16, the wrapping key 24 from the server 12 and storing it in the volatile memory 20 of the hardware security module 10; and (v) encrypting a secret entity 28 with the wrapping key 24 and storing the encrypted secret entity 32 in the persistent memory 22 of the hardware security module 10. The secret entity 28 can e.g. be a master key. The wrapping key 24 can favorably be attributed exclusively to the hardware security module 10.

In the data processing system, the terminal 36, the computer system 212, the server 12 are accessible in network 14. The terminal 36, operated by a customer, establishes a connection 50 to the HSM 10, via computer system 212 operated by the operating system X, as well as a connection 52 to the server 12. The server 12 provides information including, a generated wrapping key 24 attributed to the HSM 10. Further the server 12 is controlling access via a list of hardware security modules 34 authorized to access the server 12 via a secure connection 16. The HSM 10 connects to server 12 via a secure connection 16, passing through the computer system 212, or directly without passing through the computer system 212. The computer system connects the HSM 10 via connection 56. The HSM contains information such as the network address 18 of the server 12, a private key 30 of the HSM 10 itself, and after initializing an encrypted secret entity 32. The HSM 10 is active as long as it is supplied with power and attached to the computer system 212 it was connected to when it received the wrapping key 24 from the server 12.

Figure 2:
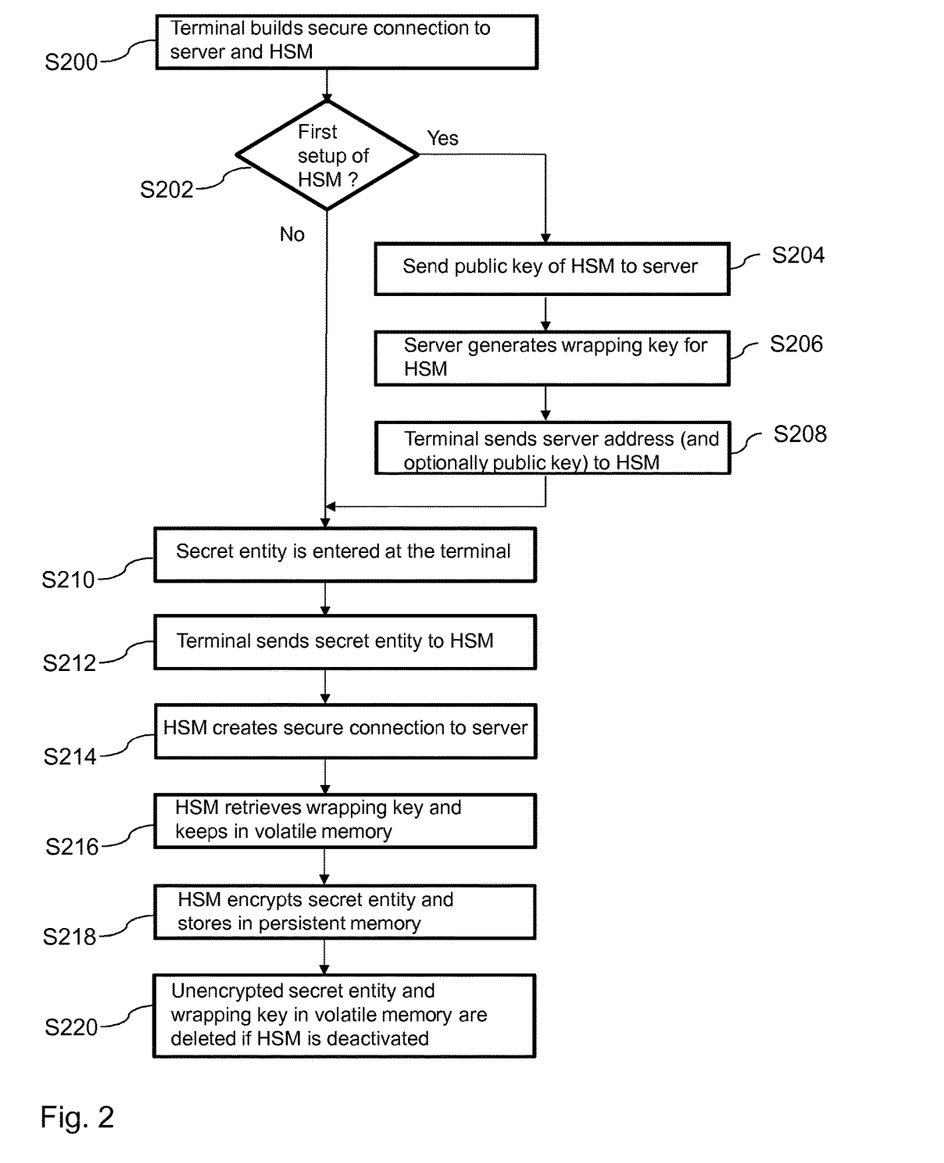
FIG. 2 a flow chart of one embodiment for initializing the server and hardware security module, in accordance with one or more aspects of the present invention.

A process for initializing a server 12 and a hardware security module 10 connected to a computer system 212 and a server 12 according to one or more embodiments is depicted in FIG. 2. The depicted flow for initialization of the server 12 and the HSM 10 reads as follows. A trusted user terminal 36, operated by a customer, builds secure connections 52 to the authentication server 12 and the HSM 10 in step S200. If this is the first setup for the HSM 10, checked in step S202, then the terminal 36 sends the public key 26 of the HSM 10 to the authentication server 12, step S204. The authentication server 12 generates a wrapping key 24 for the HSM 10 and stores it together with the public key 26 of the HSM in step S206. The terminal 36 then, in step S208, sends the network address 18 and optionally a public key of the authentication server 12 to the HSM 10. The HSM 10 stores this network address 18 and the optional public key of the server 12. The customer enters a secret entity 28 in the terminal 36 in step S210. The terminal 36 sends the secret entity 28 to the HSM 10 in step S212, wherein the HSM 10 keeps secret entities 28 in the volatile memory 20 only. The HSM 10 creates a secure connection 16 to the authentication server 12 in step S214, using the network address 18, and optionally, the public key that was sent by the terminal 36 before. The HSM 10 retrieves the wrapping key 24 in step S216 and keeps it in the volatile memory 20 only. The HSM 10, in step S218, encrypts the secret entity 28 with the wrapping key 24 and stores it in the persistent memory 22. The unwrapped secret entity 28 and the wrapping key 24 are lost if the HSM 10 is deactivated/unplugged from the computer system 212 in step S220, because the HSM 10 is not powered. An alternative would be that the secret entity 28 could be encrypted by the terminal 36 before sending it to the HSM 10.

Figure 3:
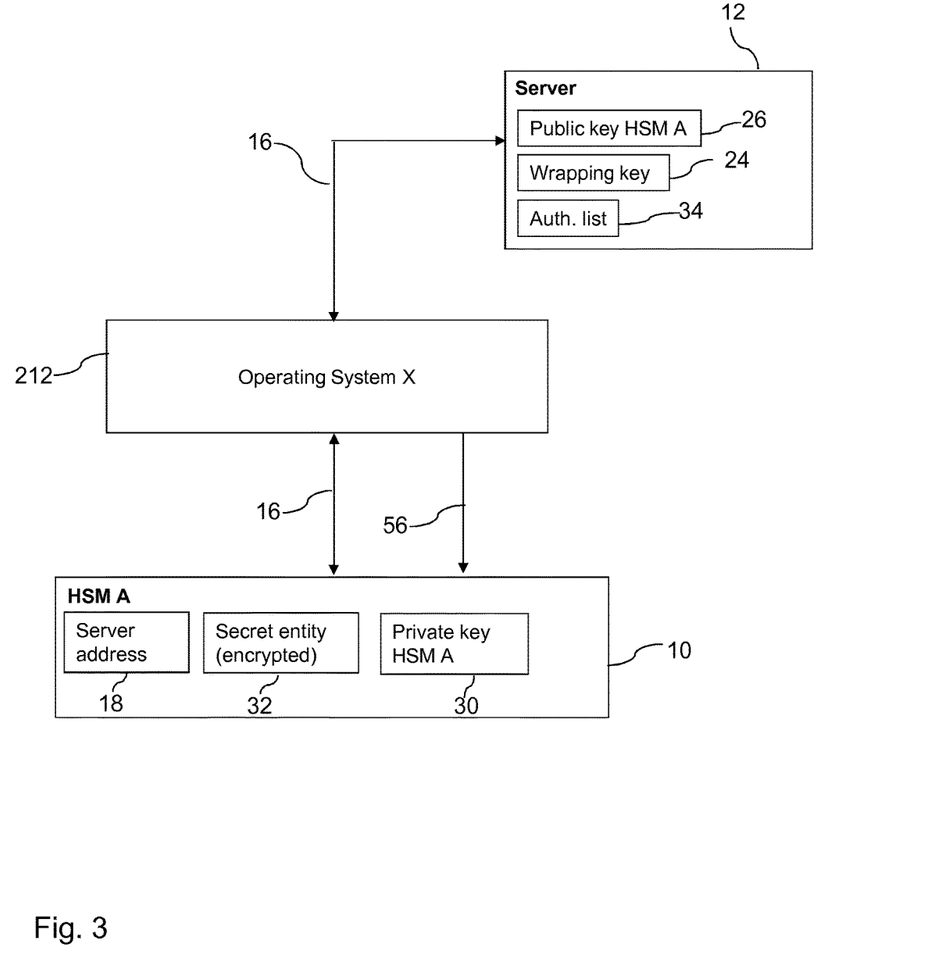
FIG. 3 one embodiment for using a hardware security module connected to a computer system and a server, in accordance with one or more aspects of the present invention.

FIG. 3 shows one embodiment for using a hardware security module 10 connected to a computer system 212 and a server 12 according to one or more aspects of the present invention. The method for using hardware security module 10 connectable to computer system 212, may comprise (i) providing a volatile memory 20 in the hardware security module 10; (ii) providing a persistent memory 22 in the hardware security module 10; (iii) providing a wrapping key 24 in the server 12; (iv) providing a network address 18 of the server 12 in the persistent memory 22 of the hardware security module 10; (v) providing an encrypted secret entity 32 in the persistent memory 22 of the hardware security module 10; (vi) providing a private key 30 in the persistent memory 22 of the hardware security module 10; (vii) providing a public key 26 of the hardware security module 10 in the server 12. In case the hardware security module 10 is connected to a computer systems 212, the method may comprise (viii) establishing a secure connection 16 between the hardware security module 10 and the server 12; (ix) retrieving, via the secure connection 16, the wrapping key 24 from the server 12 and storing it in the volatile memory 20 of the hardware security module 10; (x) decrypting the encrypted secret entity 32 with the wrapping key 24 and storing the decrypted secret entity 28 in the volatile memory 20 of the hardware security module 10. Here only the secure connection 16, which may pass through the computer system 212 or not, to the server 12 is used for retrieving the wrapping key 24 for decrypting the encrypted secret entity 32, stored in the persistent memory 22 of the HSM 10. The HSM 10 is triggered to be activated by the connection 56 established when plugging the HSM 10 to the computer system 212. The server 12 may be controlling an access of the computer system 212 via additional authorization data like passwords or the like.

Figure 4:
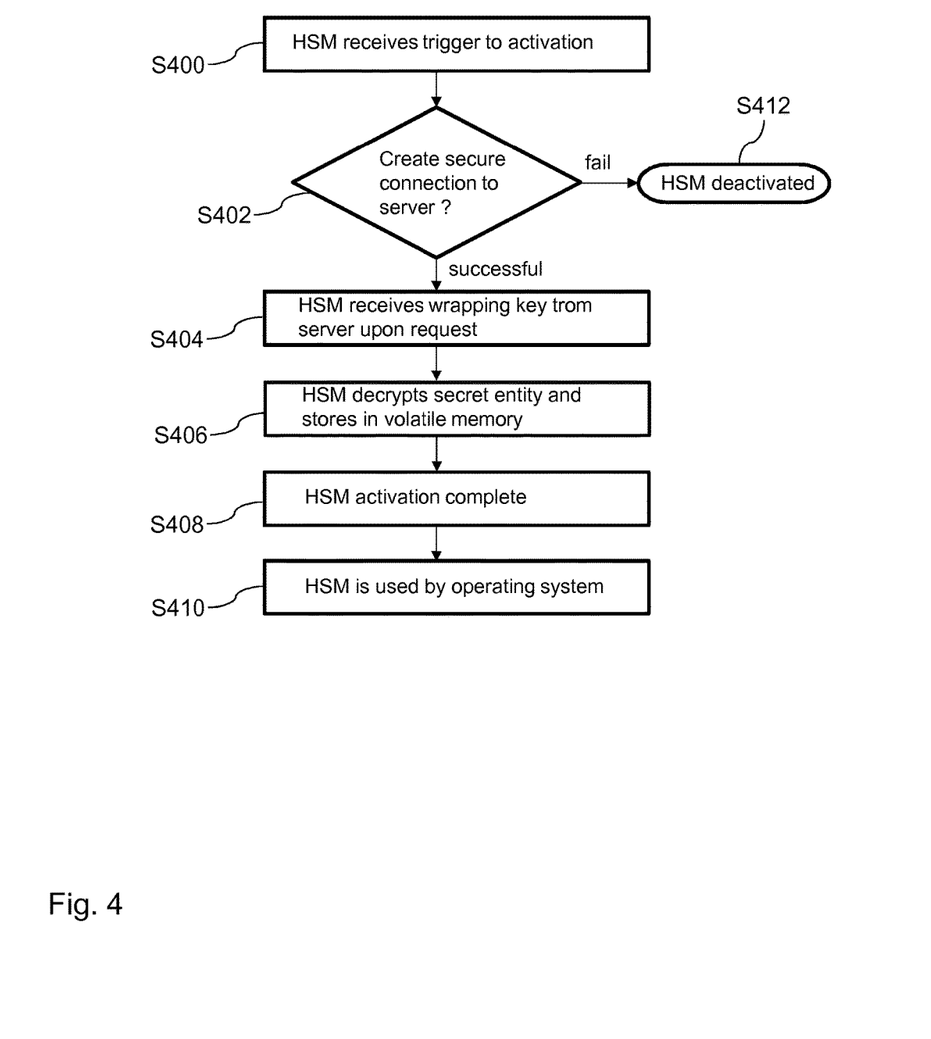
FIG. 4 a flow chart of one embodiment for using the hardware security module connected to the computer system and the server of FIG. 3, in accordance with one or more aspects of the present invention.

A process for using a hardware security module 10 connected to computer system 212 and server 12 according to one or more embodiments is depicted in FIG. 4. The flow for using the HSM 10 with the computer system 212 in order to access a stored secret entity 32 reads as follows. The HSM 10 receives a trigger to activation from the computer system 212 in step S400. Then, in step S402 the HSM 10 creates a secure connection 16 to the authentication server 12, whose network address 18 is stored in the persistent memory 22 of the HSM 10 together with a public key of the server 12. If the authentication server 12 cannot be contacted or the HSM 10 is flagged in the authentication server 12 as disabled in the disablement switch 34, the secure connection 16 cannot be established and then the HSM 10 fails to activate, step S412. Else, if the secure connection 16 can be established, the HSM 10 receives its wrapping key 24 upon request from the authentication server 12 in step S404 and keeps it in the volatile memory 20 only. The HSM 10, in step S406, decrypts the encrypted secret entity 32 using the wrapping key 24 and keeps it in the volatile memory 20 only. The HSM 10 activation completes, step S408, and the operating system of the computer system 212 uses the HSM 10, step S410.

Figure 5:
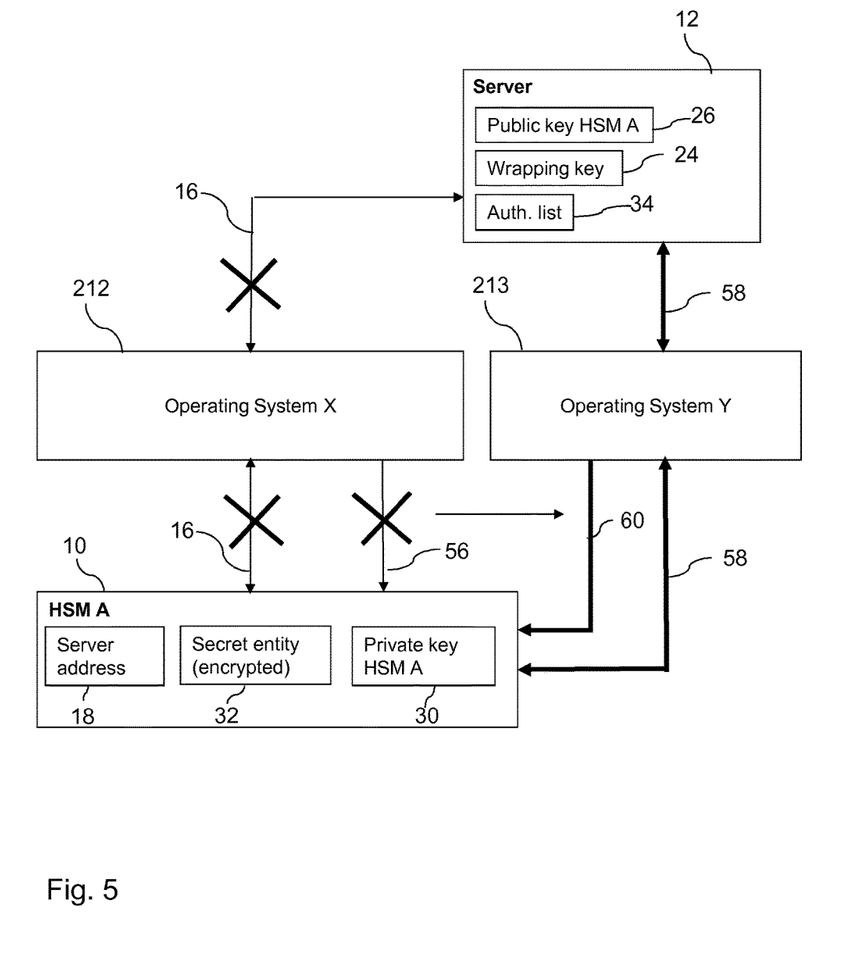
FIG. 5 one embodiment for migrating a hardware security module from one computer system to another computer system, in accordance with one or more aspects of the present invention.

FIG. 5 depicts an embodiment for migrating hardware security module 10 from one computer system 212 to another computer system 213 according to one or more aspects of the present invention. If the HSM 10 is plugged to another computer system 213, which is not the one where the HSM 10 was initialized with or was working before, the HSM 10 will also start working as before. The operating system Y of the computer system 213 sends a trigger 60 to the HSM 10 to activate the HSM 10. Then the HSM 10 tries to establish a secure connection 58 to the server 12 as before. The secure connection 58 may run through the computer system 213 or directly to the server 12. The secure connection 58 will be established as long as the HSM 10 is on the authorization list 34 of the server 12 with a flag being authorized to access the server 12. Then the same process as described in FIG. 4 continues. The HSM 10 receives the wrapping key 24, decrypts the encrypted secret entity 32 and keeps it in the volatile memory 20 in order to complete activation.

Figure 6:
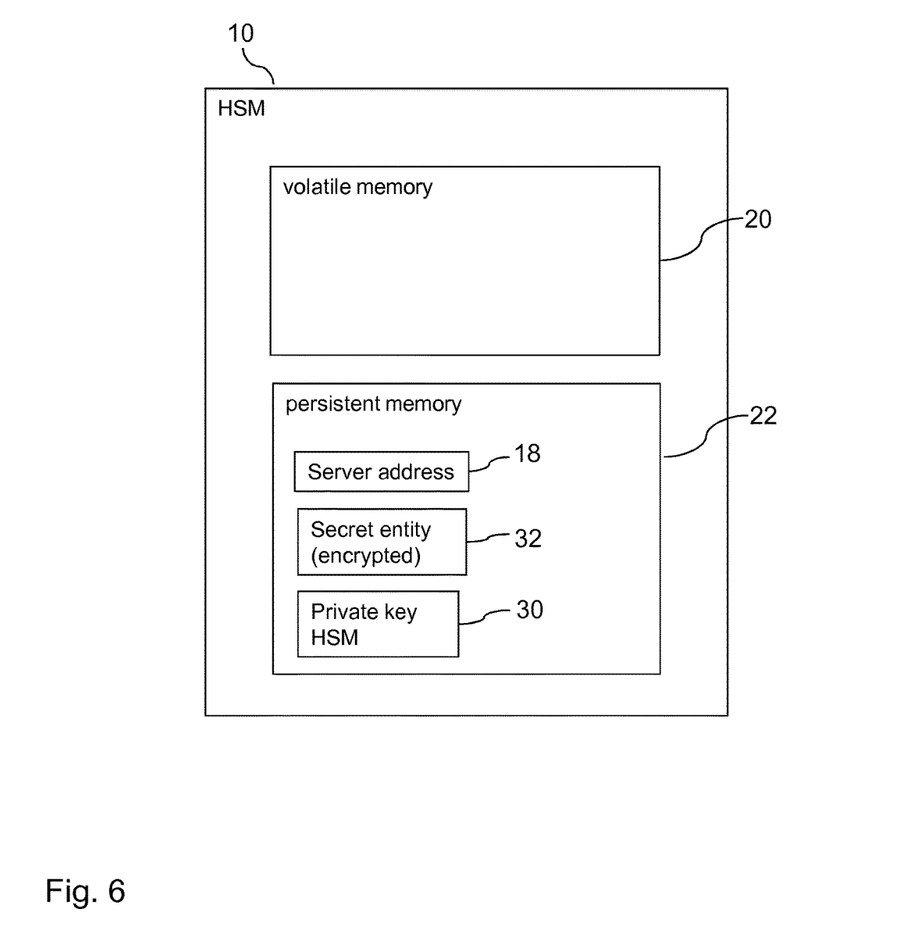
FIG. 6 one embodiment of a hardware security module without power or after start up of the HSM, in accordance with one or more aspects of the present invention.

FIG. 6 shows a hardware security module 10 without power or after start up of the hardware security module 10, according to one ore more embodiments of the present invention. The hardware security module 10, comprising at least a persistent memory 22 and at least a volatile memory 20, is configured to store at least a network address 18 of a server 12, an encrypted secret entity 32, and a private key 30 in the persistent memory 22. This means that the HSM 10 is already initialized before, as it contains in the persistent memory 22 the encrypted secret entity 32. Yet the HSM 10 itself is not able to decrypt the secret entity 32 as it does not possess the wrapping key 24 necessary for decryption. The wrapping key 24 is only available if there is a secure connection 16 to the server 12.

The volatile memory 20 therefore is empty because the HSM 10 is not in an active state.

Figure 7:
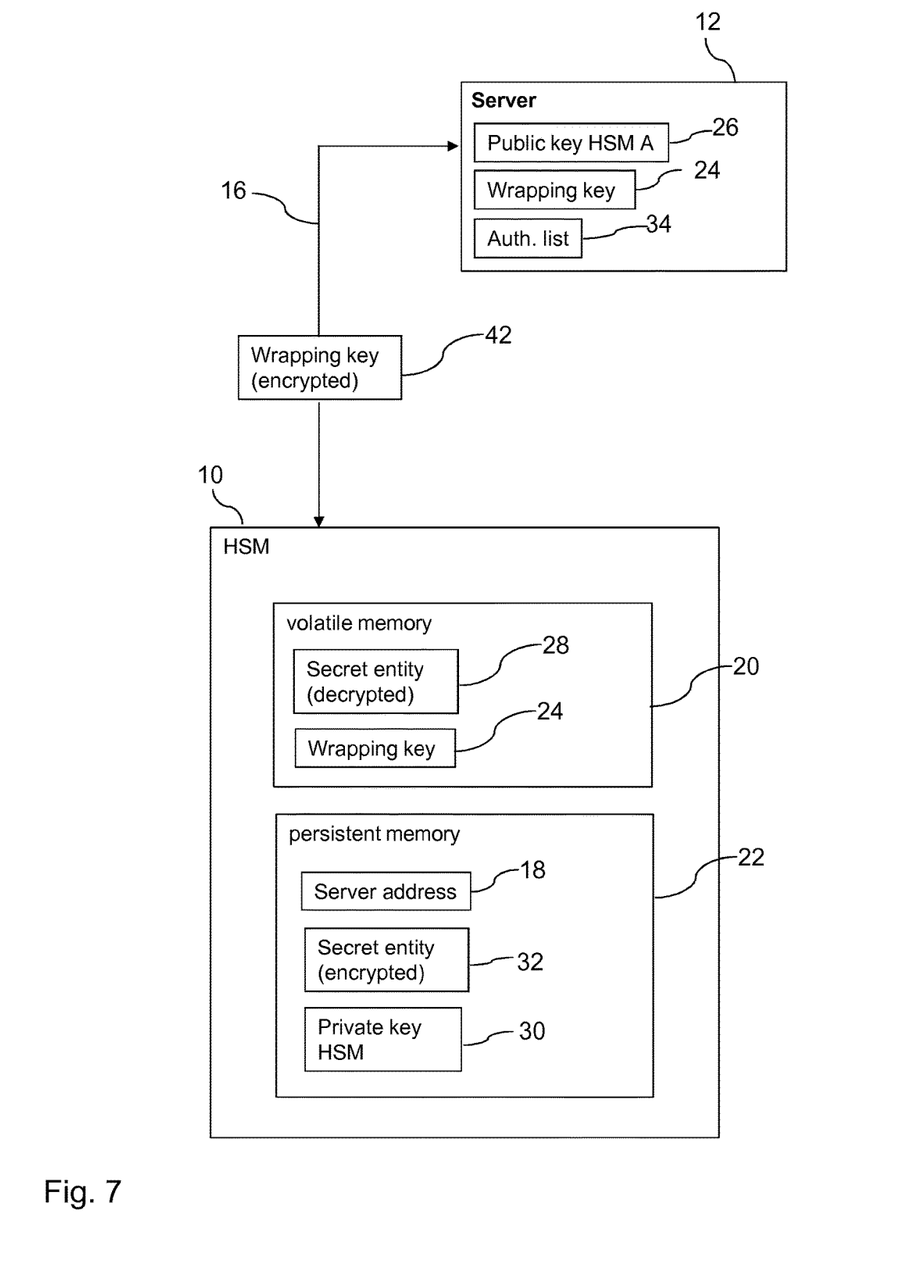
FIG. 7 one embodiment of an active hardware security module retrieving a wrapping key from a server, in accordance with one or more aspects of the present invention.

In FIG. 7, an active hardware security module 10 is shown retrieving wrapping key 24 from server 12, in accordance with one or more aspects of the present invention. The HSM 10 has established a secure connection 16 to the server 12. The server 12 is sending upon request the wrapping key 24, 42 which is encrypted by the public key 26 of the HSM 10 stored in the server 12. The HSM 10 can decrypt the wrapping key 42 with the own private key 30 and stores then the decrypted wrapping key 24 in the volatile memory 20. Following the HSM 10 may use the wrapping key 24 to decrypt the encrypted secret entity 32 and store it also in the volatile memory 20 for further use. The wrapping key 24 may be deleted from the volatile memory 20 of the hardware security module 10 after decrypting the encrypted secret entity 32. The volatile memory 20 itself will be deleted upon powering off the hardware security module 10, by, for example, removing the HSM 10 from a computer system 212.

Figure 8:
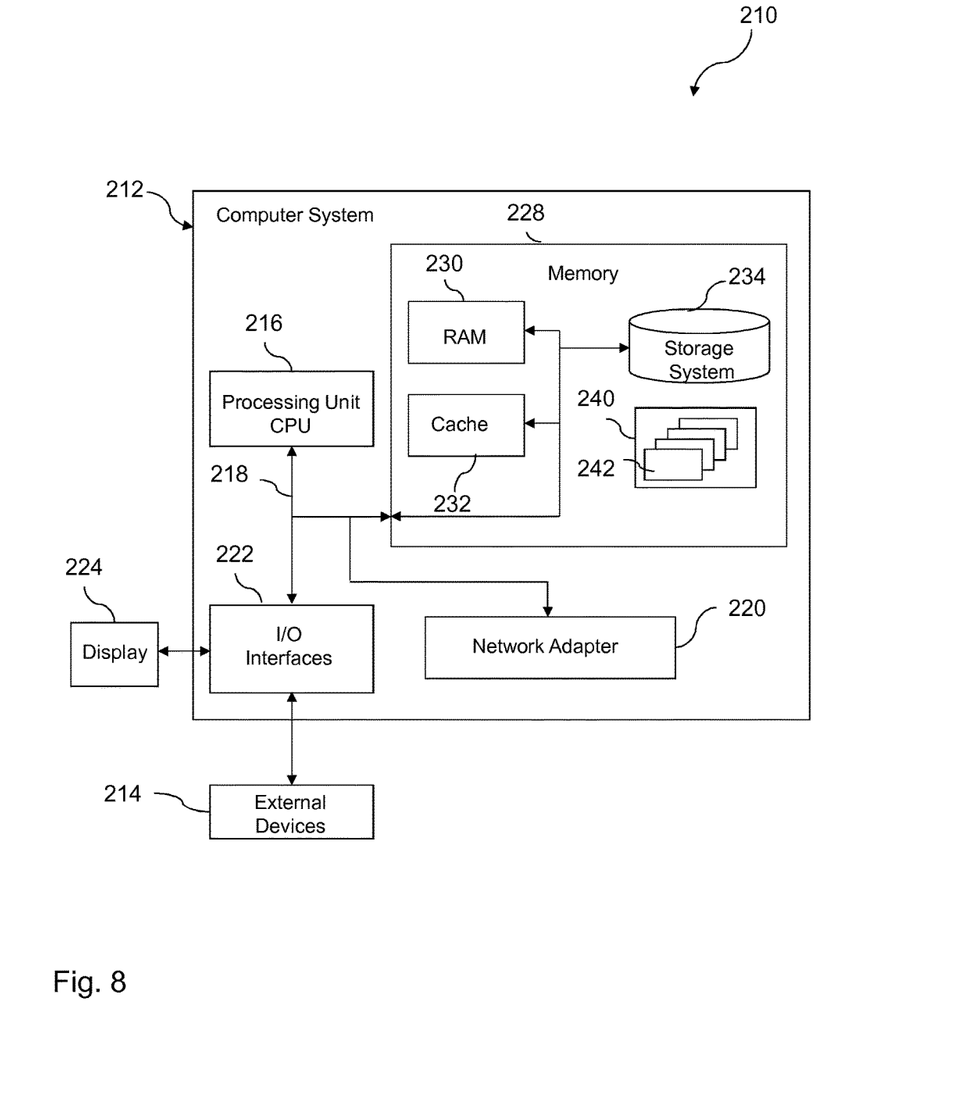
FIG. 8 an example embodiment of a data processing system for implementing a method according to one or more aspects of the invention.

Referring now to FIG. 8, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e. g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Those skilled in the art will note from the above description that provided herein are methods for using a hardware security module on different computer systems in a secure way, as well as hardware security modules and data processing systems for performing such methods on different computer systems in a secure way.

According to one aspect of the present invention, a method is disclosed for using a hardware security module (HSM) connectable to two or more computer systems, the computer systems being connectable to a server within a common network, the method including: (i) providing a volatile memory in the hardware security module; (ii) providing a persistent memory in the hardware security module; (iii) providing a wrapping key in the server; (iv) providing a network address of the server in the persistent memory of the hardware security module; (v) providing an encrypted secret entity in the persistent memory of the hardware security module; (vi) providing a private key in the persistent memory of the hardware security module and (vii) providing a public key of the hardware security module in the server. In case the hardware security module is connected to one of the computer systems, the method is further comprising (viii) establishing a secure connection between the hardware security module and the server; (ix) retrieving, via the secure connection, the wrapping key from the server and storing it in the volatile memory of the hardware security module; and (x) decrypting the encrypted secret entity with the wrapping key and storing the decrypted secret entity in the volatile memory of the hardware security module.

Advantageously, a method is provided for using a hardware security module on different eligible computer systems in a secure way, while preventing the use on other computer systems.

In the present state of the art, HSMs, such as crypto devices, are configured in such a way that if they are unplugged from a computer system, they automatically delete the secret entity they store. This is an important feature to prevent theft of a secret entity, but it has the following disadvantages: it prevents moving the HSM to other computer systems within a data center and it requires an internal power source, like a battery, to perform the deletion of the secret data when the card is unplugged from a computer system.

According to the present invention, an HSM depends on a secure connection to an authentication server (abbreviated as server), before it grants the usage of the secret entity it stores. The authentication server is placed in a datacenter intranet. Thus, only the authentication server has to be protected against theft. Therefore the HSM can be moved around as long as it can reach the authentication server. The secret entity is stored in an encrypted mode in the HSM. The secret entity cannot be recovered without a wrapping key stored in the authentication server. So the HSM alone cannot recover the secret entity without retrieving the wrapping key from the server.

Extensions to a state of the art security model comprise storing a network address as well as a public key of the server in the HSM. Further the secret entity is saved in an encrypted mode in the HSM using a wrapping key generated by the server. The server is keeping for each HSM a public key of the HSM, the wrapping key and a disablement switch, which is a list of HSMs or operating systems forwarding request from HSMs whose access to the server is no longer valid.

A flow for using the HSM with a computer system in order to access a stored secret entity could include the following. The HSM receives a trigger to activation. Then the HSM creates a secure connection to the authentication server, whose network address is stored in the persistent memory of the HSM. If the authentication server cannot be contacted or the HSM or the operating system that the HSM is attached to is flagged in the authentication server as disabled in the disablement switch, the secure channel cannot be established and then the HSM fails to activate. Else, if the secure connection can be established, the HSM receives its wrapping key upon request from the authentication server and keeps it in the volatile memory only. The HSM decrypts the encrypted secret entity using the wrapping key and keeps it in the volatile memory only. The HSM activation completes and the operating system of the computer system may use the HSM.

Thus, summarizing, the HSM stores a secret entity permanently in a locked manner in the persistent memory such that upon power up the HSM cannot use that secret entity. The HSM can only use the secret entity and provide services based on the secret entity after a secure connection to an authentication server has been established and the authentication server has provided a wrapping key to decrypt or unlock the secret entity. Further the unlocked secret entity will be kept in the volatile memory only, allowing the HSM to provide services based on its secret entity as long as the HSM is connected to power and forgetting the unlocked secret entity as soon as the HSM is unplugged from the power supply. The HSM itself does not cover an internal power supply.

According to a further advantageous aspect of the present invention, a method is proposed for initializing a server and a hardware security module being connectable to two or more computer systems, the computer systems being connectable to the server within a common network, using a trusted terminal, the method comprising (i) storing a network address of the server in the persistent memory of the hardware security module; (ii) storing the public key of the hardware security module on the server; (iii) establishing a secure connection between the hardware security module and the server; (iv) retrieving, via the secure connection, the wrapping key from the server and storing it in the volatile memory of the hardware security module; and (v) encrypting a secret entity with the wrapping key and storing the encrypted secret entity in the persistent memory of the hardware security module.

A flow for initialization of the HSM therefore could be as follows. A trusted user terminal, operated by a customer, builds secure connections to the authentication server and the HSM. If this is the first setup for the HSM, then the terminal sends the public key of the HSM to the authentication server. The authentication server generates a wrapping key for the HSM and stores it together with the public key of the HSM. The terminal then sends the network address of the authentication server to the HSM. The HSM stores this network address. The customer enters a secret entity in the terminal. The terminal sends the secret entity to the HSM, wherein the HSM keeps secret entities in the volatile memory only. The HSM creates a secure connection to the authentication server, using the network address and public key that were sent by the terminal before. The HSM retrieves the wrapping key and keeps it in the volatile memory only. The HSM encrypts the secret entity with the wrapping key and stores it in the persistent memory. The unwrapped secret entity and the wrapping key are lost if the HSM is deactivated/unplugged from the computer system, because the HSM is unpowered. An alternative would be that the secret entity could be encrypted by the terminal before sending it to the HSM.

Advantageously, the method may further comprise transferring the wrapping key from the server to the hardware security module encrypted with a public key of the hardware security module. Then the HSM is capable of decrypting the wrapping key using the private key of the HSM and storing it in the volatile memory for further decrypting of the secret entity.

Due to a further favorable embodiment, the method may comprise deleting the wrapping key from the volatile memory of the hardware security module after decrypting the encrypted secret entity. Then the wrapping key is no longer used by the HSM and thus it would be favorable to delete the wrapping key due to security reasons from the volatile memory, where the wrapping key is stored in a decrypted mode for using it for decryption of the secret entity.

Advantageously, the method may comprise the secret entity being a master key, which is an overall key to all kind of secret entities of a computer system or computer network. Alternatively the secret entity may also be a table of keys. Another possibility is that the secret entity is a retained key, tokens, indices of a table, a certificate for transportation of public keys or the like.

In one advantageous embodiment, the method further may include deleting the volatile memory upon powering off the hardware security module. Thus the decrypted secret entity as well as the decrypted wrapping key are deleted and even if the HSM is used with an unauthorized computer system by unauthorized persons, e.g., it would not be possible to take access to the encrypted secret entity stored in the persistent memory of the HSM.

Advantageously, the method may further comprise attributing the wrapping key exclusively to the hardware security module. Thus administration of an exclusively attributed wrapping key for each HSM used in a data processing system is possible for generating a higher security level. So, even in the case that one specific wrapping key would be disabled because the corresponding HSM is misused or lost, the other HSMs could still be used in a secure way because they have own wrapping keys attributed.

In one or more embodiments, the method may comprise the server controlling an access of the first computer system and of the second computer system via authorization data. Thus additionally, e. g., passwords could be used for controlling access from a computer system to the server and/or vice versa, which would result in an additional higher security level for the use of HSMs in a distributed data processing system.

Favorably, the method may include the server controlling access via a list of hardware security modules being authorized to access the server via a secure connection. Thus only authorized HSMs are able to establish a connection to the server and particularly to establish a secure connection to the server. Alternatively a disablement switch, representing a negative list of HSM which are no longer authorized to access the server, can also prevent that a HSM could contact a server for which it is not authorized.

According to one or more further advantageous aspects of the present invention, a hardware security module is proposed, comprising at least a persistent memory and at least a volatile memory, the hardware security module being configured to store at least a network address of a server, an encrypted secret entity, and a private key in the persistent memory, the hardware security module further being configured for performing a method as described above. The HSM stores a secret entity permanently in a locked manner in the persistent memory such that upon power up the HSM cannot use that secret entity. The HSM can only use the secret entity and provide services based on the secret entity after a secure connection to an authentication server has been established and the authentication server has provided a wrapping key to unlock the secret entity. Further the unlocked secret entity will be kept in the volatile memory only, allowing the HSM to provide services based on its secret entity as long as the HSM is connected to power and forgetting the unlocked secret entity as soon as the HSM is unplugged from the power supply. The HSM itself does not cover an internal power supply like a battery.

Advantageously, the hardware security module may further be configured to delete the volatile memory upon removing the hardware security module from a computer system. Thus the decrypted secret entity as well as the decrypted wrapping key are deleted and even if the HSM is used with an unauthorized computer system by unauthorized persons, e.g., it would not be possible to take access to the encrypted secret entity stored in the persistent memory of the HSM.

In one or more embodiments, the hardware security module may further be active while being supplied with power and a sole connection to the computer system being established and the hardware security module having received a wrapping key from the server. Thus information stored in the volatile memory of the HSM is lost after unplugging it from a computer system.

According to a further advantageous aspect of the present invention, a data processing program for execution in a data processing system is provided comprising an implementation of an instruction set for performing a method as described above when the data processing program is run on a computer.

Further, a computer program product is disclosed comprising a computer usable medium including a computer readable program, wherein the computer readable program when executed on a computer causes the computer to perform a method for using a hardware security module (HSM) connectable to two or more computer systems, the computer systems being connectable to a server within a common network, and the method includes: (i) providing a volatile memory in the hardware security module; (ii) providing a persistent memory in the hardware security module; (iii) providing a wrapping key in the server; (iv) providing a network address of the server in the persistent memory of the hardware security module; (v) providing an encrypted secret entity in the persistent memory of the hardware security module; (vi) providing a private key in the persistent memory of the hardware security module and (vii) providing a public key of the hardware security module in the server. In case the hardware security module is connected to one of the computer systems, the method is further comprising (viii) establishing a secure connection between the hardware security module and the server; (ix) retrieving, via the secure connection, the wrapping key from the server and storing it in the volatile memory of the hardware security module; and (x) decrypting the encrypted secret entity with the wrapping key and storing the decrypted secret entity in the volatile memory of the hardware security module.

A further computer program product is provided comprising a computer usable medium including a computer readable program, wherein the computer readable program when executed on a computer causes the computer to perform a method for initializing a server and a hardware security module connectable to two or more computer systems, the computer systems being connectable to the server within a common network, using a trusted terminal, the method comprising (i) storing a network address of the server in the persistent memory of the hardware security module; (ii) storing the public key of the hardware security module on the server; (iii) establishing a secure connection between the hardware security module and the server; (iv) retrieving, via the secure connection, the wrapping key from the server and storing it in the volatile memory of the hardware security module; and (v) encrypting a secret entity with the wrapping key and storing the encrypted secret entity in the persistent memory of the hardware security module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

Note that the block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method for using a hardware security module connectable to multiple computer systems, the multiple computer systems being connectable to a server within a common network, and the method comprising:
   providing a network address of the server in persistent memory of the hardware security module;
   providing an encrypted secret entity in the persistent memory of the hardware security module, wherein the encrypted secret entity is provided from a secret entity encrypted using a wrapping key, and wherein the encrypted secret entity remains in the persistent memory of the hardware security module when the hardware security module is disconnected from a computer system of the multiple computer systems;
   providing a private key in the persistent memory of the hardware security module;
   based on the hardware security module being connected to one computer system of the multiple computer systems, the method comprising:
      establishing a secure connection between the hardware security module and the server;
      retrieving from the server, via the secure connection, an encrypted wrapping key generated by the server, the encrypted wrapping key being an encrypted version of the wrapping key used to provide the encrypted secret entity;
      decrypting the encrypted wrapping key using the private key to obtain the wrapping key and storing the wrapping key in volatile memory of the hardware security module; and
      decrypting the encrypted secret entity using the wrapping key and storing the decrypted secret entity in the volatile memory of the hardware security module.

2. The method of claim 1, wherein providing the encrypted secret entity comprises encrypting a secret entity with the wrapping key and storing the encrypted secret entity in the persistent memory of the hardware security module.

3. The method of claim 1, further comprising retrieving the encrypted wrapping key from the server encrypted with a public key of the hardware security module.

4. The method of claim 1, further comprising deleting the wrapping key from the volatile memory of the hardware security module after decrypting the encrypted secret entity.

5. The method of claim 1, wherein the secret entity is a master key.

6. The method of claim 1, further comprising deleting the volatile memory upon powering off the hardware security module.

7. The method of claim 1, further comprising attributing the wrapping key exclusively to the hardware security module.

8. The method of claim 1, wherein the server controls access thereto via a list of hardware security modules authorized to access the server via a secure connection, the hardware security module being identified in the list of hardware security modules.

9. A system for using a hardware security module connectable to multiple computer systems, the multiple computer systems being connectable to a server within a common network, and the system comprising:
   a memory; and
   a processing device communicatively coupled to the memory, wherein the system performs:
      providing a network address of the server in persistent memory of the hardware security module, wherein the encrypted secret entity is provided from a secret entity encrypted using a wrapping key, and wherein the encrypted secret entity remains in the persistent memory of the hardware security module when the hardware security module is disconnected from a computer system of the multiple computer systems;
      providing an encrypted secret entity in the persistent memory of the hardware security module;
      providing a private key in the persistent memory of the hardware security module;
      based on the hardware security module being connected to one computer system of the multiple computer systems, performing:
         establishing a secure connection between the hardware security module and the server;
         retrieving from the server, via the secure connection, an encrypted wrapping key generated by the server, the encrypted wrapping key being an encrypted version of the wrapping key used to provide the encrypted secret entity;
         decrypting the encrypted wrapping key using the private key to obtain the wrapping key and storing the wrapping key in volatile memory of the hardware security module; and
         decrypting the encrypted secret entity using the wrapping key and storing the decrypted secret entity in the volatile memory of the hardware security module.

10. The system of claim 9, wherein providing the encrypted secret entity comprises encrypting the secret entity with the wrapping key and storing the encrypted secret entity in the persistent memory of the hardware security module.

11. The system of claim 9, further comprising retrieving the encrypted wrapping key from the server encrypted with a public key of the hardware security module.

12. The system of claim 9, further comprising deleting the wrapping key from the volatile memory of the hardware security module after decrypting the encrypted secret entity.

13. The system of claim 9, wherein the secret entity is a master key.

14. The system of claim 9, further comprising deleting the volatile memory upon powering off the hardware security module.

15. The system of claim 9, further comprising attributing the wrapping key exclusively to the hardware security module.

16. The system of claim 9, wherein the server controls access thereto via a list of hardware security modules authorized to access the server via a secure connection, the hardware security module being identified in the list of hardware security modules.

17. A computer program product for using a hardware security module connectable to multiple computer systems, the multiple computer systems being connectable to a server within a common network, the computer program product comprising:
   a non-transitory computer readable storage medium having computer readable instructions embodied therewith, the computer readable instructions being executable to perform:
      providing a network address of the server in persistent memory of the hardware security module;
      providing an encrypted secret entity in the persistent memory of the hardware security module, wherein the encrypted secret entity is provided from a secret entity encrypted using a wrapping key, and wherein the encrypted secret entity remains in the persistent memory of the hardware security module when the hardware security module is disconnected from a computer system of the multiple computer systems;
      providing a private key in the persistent memory of the hardware security module;
      based on the hardware security module being connected to any computer system of the multiple computer systems, the method comprising:
         establishing a secure connection between the hardware security module and the server;
         retrieving from the sender, via the secure connection, an encrypted wrapping key generated by the server, the encrypted wrapping key being an encrypted version of the wrapping key used to provide the encrypted secret entity;
         decrypting the encrypted wrapping key using the private key to obtain the wrapping key and storing the wrapping key in volatile memory of the hardware security module; and
         decrypting the encrypted secret entity using the wrapping key and storing the decrypted secret entity in the volatile memory of the hardware security module.

18. The computer program product of claim 17, wherein providing the encrypted secret entity comprises encrypting the secret entity with the wrapping key and storing the encrypted secret entity in the persistent memory of the hardware security module.

19. The computer program product of claim 17, further comprising retrieving the encrypted wrapping key from the server encrypted with a public key of the hardware security module.

20. The computer program product of claim 17, further comprising deleting the wrapping key from the volatile memory of the hardware security module after decrypting the encrypted secret entity.

* * * * *